United States Patent
Cortina et al.

(10) Patent No.: US 8,307,737 B2
(45) Date of Patent: Nov. 13, 2012

(54) STEERING WHEEL

(75) Inventors: Roger Cortina, Amherstburg (CA);
Georgina Leary, Macomb, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 1961 days.

(21) Appl. No.: 11/185,607

(22) Filed: Jul. 20, 2005

(65) Prior Publication Data

US 2007/0017317 A1    Jan. 25, 2007

(51) Int. Cl.
*B62D 1/04*        (2006.01)
(52) U.S. Cl. .......................................................... 74/552
(58) Field of Classification Search ............... 74/552, 74/553, 557; 280/731
See application file for complete search history.

(56) References Cited

U.S. PATENT DOCUMENTS

| | | | | |
|---|---|---|---|---|
| 4,962,947 A * | 10/1990 | Nagata et al. | ................. | 280/777 |
| 5,398,568 A * | 3/1995 | Worrell et al. | ................... | 74/552 |
| 6,478,330 B2 * | 11/2002 | Fujita | ............................ | 280/731 |
| 6,536,303 B2 | 3/2003 | Fransioli et al. | | |
| 6,651,526 B1 | 11/2003 | Imaizumi et al. | | |
| 6,820,894 B2 * | 11/2004 | Lim et al. | ...................... | 280/731 |
| 2001/0039851 A1 * | 11/2001 | Hosoi et al. | ..................... | 74/552 |
| 2002/0023517 A1 * | 2/2002 | Ochiai et al. | .................... | 74/552 |

FOREIGN PATENT DOCUMENTS

DE         3633558 A1 *   4/1987

\* cited by examiner

*Primary Examiner* — Vicky Johnson
(74) *Attorney, Agent, or Firm* — Ralph E. Smith

(57) ABSTRACT

A steering wheel has an internal structural component formed by an armature made of a relatively rigid material such as magnesium or aluminum, or an alloy of magnesium or aluminum, and an external component made of a compressible material such as polyurethane. The armature has a hub, a rim surrounding the hub, and radial spokes extending between the hub and the rim. The external component includes an over-lay providing a rim cover for the rim and a spoke cover for each of the two spokes. The external component also includes one or more parts extending radially inwardly from the rim cover to provide an additional spoke or spokes.

12 Claims, 3 Drawing Sheets

STEERING WHEEL

FIELD OF THE INVENTION

The present invention relates to automotive steering wheels.

BACKGROUND OF THE INVENTION

Automobile manufacturers typically produce several different types of vehicles, such as sedans, minivans, SUV's, etc., each often having a different steering wheel. Several different reasons for making different steering wheels exist and may include cosmetic considerations such as styling or simply a desire to distinguish one vehicle model from another. However, designing a variety of different steering wheels can significantly increase a manufacturer's cost. This increased cost results from the fact that, in order to protect a driver from serious injury in the event of a collision, each steering wheel design must be carefully engineered to have a desired force/deflection characteristic.

Current designs for steering wheels typically involve the use of a cast armature, made of aluminum, magnesium or an alloy of aluminum or magnesium to supply the structural component, and a variety of cosmetic finish techniques, injection molding, reaction injection molding, etc., to apply an overmold component.

Traditionally the design of the armature has been predicated upon the final appearance of the steering wheel assembly itself. If the steering wheel is styled for a three spoke design, then the structural component of the steering wheel, i.e., the armature, will have three spokes. Likewise, a four spoke steering wheel will have a four spoke armature.

Accordingly, current design practice dictates that a new structural component or armature is required for each newly styled steering wheel. This introduces additional cost into each new program for unique tooling, as well as engineering research, design and development costs. In addition, the performance behavior of each new wheel must be re-validated, both at the component and vehicle level.

SUMMARY OF THE INVENTION

The steering wheel of this invention can be modified to present different steering wheel designs without materially altering its force/deflection characteristic or other physical properties and without a significant increase in cost.

According to the present invention, the steering wheel has an internal structural component or armature, which is made of a relatively rigid material and includes a hub having an interface to the steering column, a rim encircling the hub, and at least two spokes extending between the hub and the rim. The steering wheel also includes an external component made of a compressible material including an over-lay providing a complete outer cover for the rim and a complete outer cover for each of the two spokes. The external component of compressible material may also include one or more parts extending radially inwardly from the rim cover to provide an additional spoke or spokes for the steering wheel. The number of additional spokes may vary to alter the design appearance of the steering wheel without materially changing the force/deflection characteristics or other physical properties of the steering wheel and/or the armature design.

Preferably, each additional spoke consists solely of the compressible material of which the external component is made. However, the additional spoke or spokes may also be a completely different and separate part or parts rather than a portion of the external component. The principle rigidity and strength of the steering wheel is provided by the armature made up of the hub, the rim, and the two spokes. The one or more additional spokes do not materially alter the force/deflection characteristic of the steering wheel.

Preferably, the armature is made of a metal such as magnesium or aluminum or an alloy of magnesium or aluminum. The compressible material includes a resinous plastic material, preferably polyurethane.

The proposed concept successfully allows styling variations without the need to re-engineer the underlying structure of the steering wheel. In doing so, program tooling costs can be reduced substantially as only capacity tools will be required. It becomes unnecessary to have unique tooling for each styling variation. Furthermore, engineering costs are reduced substantially, as each new program will not be required to re-validate the underlying structure. At the component and vehicle level, considerable time to market reductions can be enjoyed as component parts will be available for testing purposes, and correlated, validated computational models are available for more accurate predictions.

The design concept capitalizes on the following design features: structural design of the armature to be designed using only two spokes, force-deflection curves of the armature to be more linear than current designs, and consistent rim section to allow flexibility in design.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
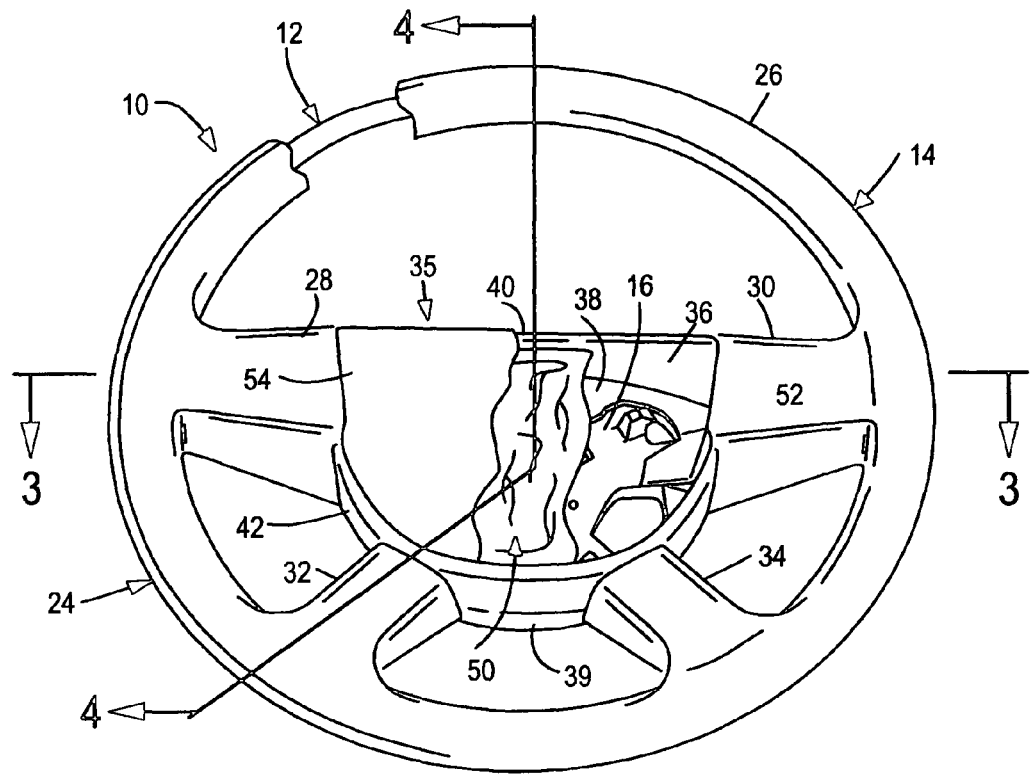
FIG. 1 is an elevational, partially sectioned view of a steering wheel constructed in accordance with the invention.
Figure 2:
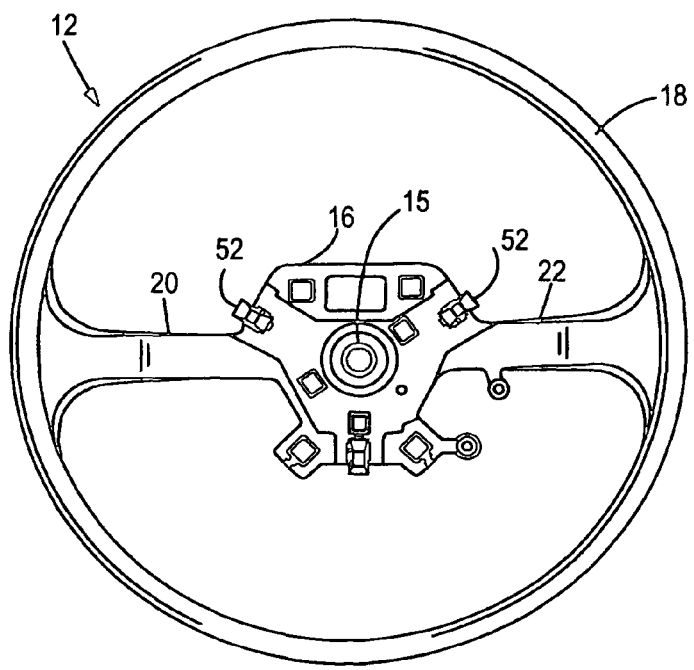
FIG. 2 is an elevational view of the armature forming a portion of the steering wheel.
Figure 3:
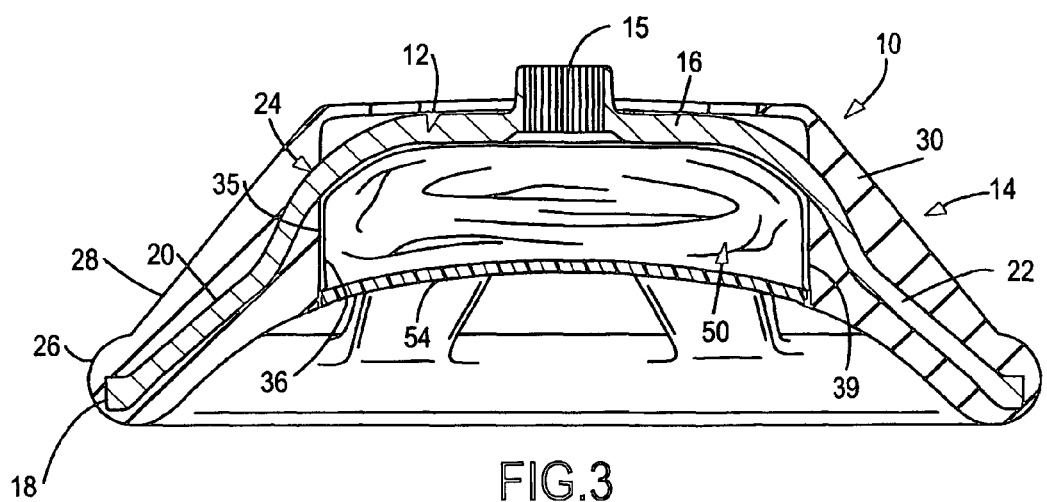
FIG. 3 is a sectional view taken on the line 3-3 in FIG. 1.
Figure 4:
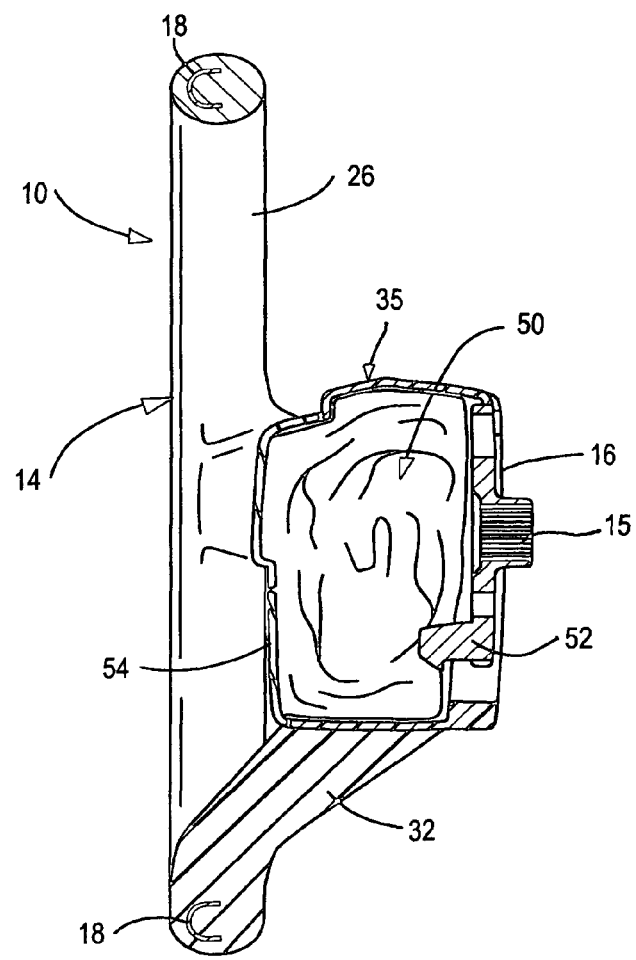
FIG. 4 is a sectional view taken on the line 4-4 in FIG. 1.

The following description of the preferred embodiments is merely exemplary in nature and is in no way intended to limit the invention, its application, or uses.

Referring now more particularly to the drawings and especially FIGS. 1-4, there is shown a steering wheel 10 for an automotive vehicle which includes an internal structural component 12 made of any relatively rigid material, but preferably a metal such as magnesium, aluminum, or an alloy of magnesium or aluminum, and an external component 14 made of a compressible material and preferably a compressible resinous plastic material. Polyurethane is most preferred. The hub has a splined center opening 15 for attachment to a steering column.

The structural component 12 of the steering wheel 10 is sometimes referred to as an armature and has a hub 16 surrounded by a circular rim 18 spaced radially outwardly from the hub. The structural component or armature 12 also includes two angularly spaced apart, radially extending spokes 20 and 22 each of which has an inner end rigidly secured to the hub 16 and an outer end rigidly secured to the rim 18. The structural component 12, including the hub 16, rim 18 and spokes 20 and 22 are preferably formed as an integral, one-piece casting.

The external component 14 preferably is a molding, and includes an over-lay or overmold 24 that completely covers the rim 18, the spokes 20, 22 and a small portion of the hub 16. The overmold or over-lay 24 includes a complete rim cover 26 on the rim 18, a complete spoke cover 28 on the spoke 20, and a complete spoke cover 30 on the spoke 22.

The external component 14 includes, as an integral portion of the molding, a molded part that extends radially inwardly from the rim cover 26 to provide an additional spoke 32 for the steering wheel 10. If desired, the external component 14 may also include, as an integral portion of the molding, a second molded part that extends radially from the rim cover 26 to provide for the steering wheel 10 a second additional spoke 34 angularly spaced from the spoke 32. In other words, the external component 14 may include only one additional spoke, like the spoke 32, or two or more additional spokes, all made of the material of the external component. Alternatively, the spokes 32 and 34 may be entirely different parts separate from either of the components 12 and 14, but secured to the component 14.

The external component 14 further includes, as a portion of the molding, a central part 35 which cooperates with the hub 16 in forming a well 36. The well 36 has a bottom 38 which is molded or secured to and cooperates with the hub 16 to close the bottom of the well, and an annular wall 39 formed by a front panel 40 and an arcuate panel 42 that connects with the front panel at laterally spaced points and curves around the sides and rear of the well. The well has an open top defined by the upper edges of the annular wall 39.

The spoke covers 28 and 30 are molded into the arcuate panel 42 of the well, as are the additional spokes 32 and 34.

An air bag module 50 is received within the well 36. The hub 16 has retainers 52 which are adapted to engage the air bag module 50 to retain the air bag module in place in the well 36. The air bag module 50 has a top cover 54 which engages over the top edges of the annular wall 39 to close the well 36 when the air bag module is clipped in place within the well.

The external component 14, including the rim cover 26, the spoke covers 28 and 30, the additional spokes 32 and 34, and the well 36 are preferably integrally joined together as portions of a single molding.

The additional spokes 32 and 34 each preferably consist solely of the compressible material of which the external component 14 is made, without any internal or external reinforcement from the armature 12, or otherwise.

The principle rigidity and strength of the steering wheel is provided by the armature made up of the hub, the rim and the two spokes 20 and 22. The one or more additional spokes 32 and 24 do not materially alter the force/deflection characteristic of the steering wheel.

Figure 5:
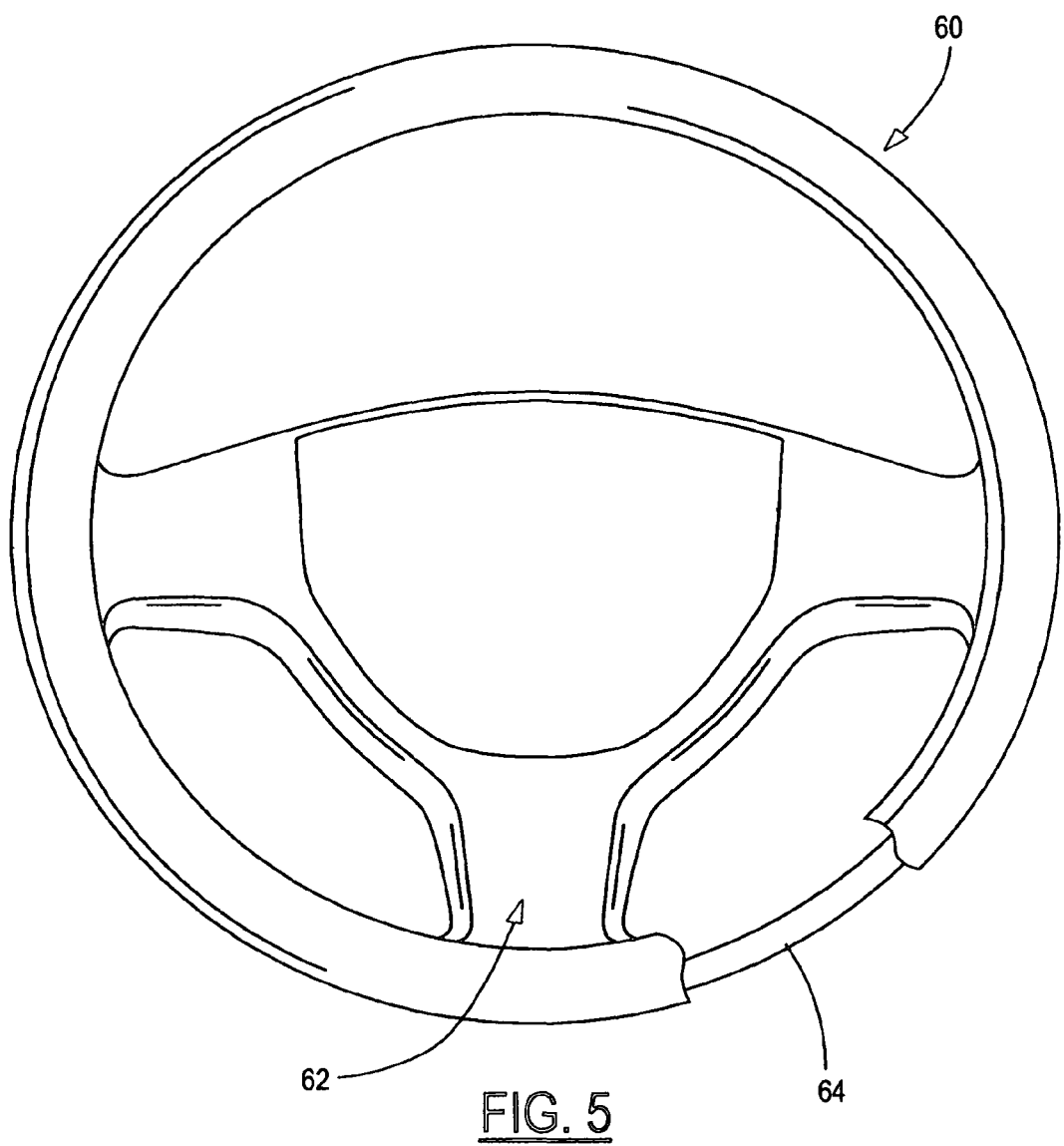
FIG. 5 is an elevational, partially sectioned view of a steering wheel of modified construction.

FIG. 5 shows a steering wheel 60 which is essentially the same as the steering wheel 10 shown in FIGS. 1-4, except that instead of having two additional unreinforced spokes made of the compressible external component, such as the two additional spokes 20 and 22 of the steering wheel 10, the steering wheel 60 has only a single unreinforced spoke 62 made of the external compressible component. The armature 64 for the steering wheel 60 is the same as the armature 12 of the embodiment of FIGS. 1-4. The purpose of the second embodiment is to show the versatility of the invention, enabling a change in design of the steering wheel without any substantial change in the force/deflection characteristic thereof.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A steering wheel for a vehicle comprising:
an internal structural component comprising an armature, said armature including a hub, a rim spaced radially outwardly from and surrounding the hub, and at least two spokes extending radially inwardly from the rim, each of said spokes having an inner end rigidly connected to said hub and an outer end rigidly connected to said rim,
an external component,
said external component including an over-lay providing a complete outer rim cover for the rim and a complete outer spoke cover for each of the two spokes, and
an additional spoke for the steering wheel extending radially inwardly from the rim cover, said additional spoke being separate from the armature and secured to the external component.

2. The steering wheel of claim 1, wherein the armature is made of a relatively rigid material.

3. The steering wheel of claim 2 wherein the relatively rigid material of said armature includes a metal selected from the group consisting of magnesium, aluminum, an alloy of magnesium and an alloy of aluminum.

4. The steering wheel of claim 1, wherein the external component is made of a compressible material.

5. The steering wheel of claim 4, wherein the compressible material of the external component includes a resinous plastic material.

6. The steering wheel of claim 5, wherein the resinous plastic material includes polyurethane.

7. The steering wheel of claim 1, wherein said external component includes a central part secured to the hub, and an inner end of the additional spoke is secured to the central part.

8. The steering wheel of claim 7, wherein said central part of the external component cooperates with the hub in forming a well, the well has a bottom closed at least in part by the hub and has an open top defined by upper edges of an annular wall of the well, and an air bag module disposed in the well, said air bag module having a cover which closes the open top of the well.

9. The steering wheel of claim 8, wherein the external component includes a second part extending radially inwardly from said rim cover to provide a second additional spoke for the steering wheel, an inner end of the second additional spoke is secured to the central part, and said second additional spoke consists solely of the compressible material of the external component without any reinforcement.

10. The steering wheel of claim 9, wherein the relatively rigid material of the armature includes a metal selected from the group consisting of magnesium, aluminum, an alloy of magnesium and an alloy of aluminum.

11. The steering wheel of claim 10, wherein the external component is a molding made of polyurethane.

12. A steering wheel for a vehicle comprising:
an internal structural component comprising an armature made of a relatively rigid material,
said armature including a hub, a rim spaced radially outwardly from and surrounding the hub, and at least two spokes extending radially inwardly from the rim, each of said spokes having an inner end rigidly connected to said hub and an outer end rigidly connected to said rim, and an external component made of a compressible material, said external component including an over-lay providing a complete outer rim cover for the rim and a complete outer spoke cover for each of the two spokes, said external component also including a part extending radially inwardly from said rim cover to provide an additional spoke for the steering wheel, said additional spoke consisting solely of the compressible material of the external component without any reinforcement.

* * * * *